UNITED STATES PATENT OFFICE 2,109,049

EXPLOSIVE

Dewitt C. McMeans, Lordsburg, N. Mex.

No Drawing. Application July 31, 1935, Serial No. 34,029. Renewed July 17, 1937

2 Claims. (Cl. 52—12)

My invention relates to an explosive and the method of making the same.

It is an object of this invention to provide an explosive of great safety, stability and efficiency, which, when exploded or burned, will not generate noxious fumes or gases, and therefore is especially adapted for use in underground work.

Furthermore, the improved explosive is not affected by climatic conditions; it will not freeze or melt. It is substantially waterproof and tho it is in granular form, it has sufficient plasticity that it may be tamped into cartridges and drill holes.

With the above and other objects in view, which will appear as the description proceeds, my invention consists in the composition of the explosive and the steps of the method producing the same.

I take equal parts of potassium chlorate and granulated sugar, first adding sufficient water to the sugar to dissolve the same and boiling the solution until a drop of the boiled sugar will harden immediately in cold water. Potassium chlorate is then stirred into the sugary syrup and the mixture is passed or bolted through a sieve or screen of a suitable gauge to give the proper grain to the resultant powder. The mass, after having passed through the sieve, is practically dry so that the grains of the same will retain their individuality.

I now combine the granulated powder thus produced with dinitrotoluene as follows, the proportions given being by weight:

| | Parts |
|---|---|
| Granulated powder | 70 |
| Wood pulp or fine sawdust | 10 |
| Dinitrotoluene | 12 |
| Toluene | 6 |
| Petrolatum | 2 |

The ingredients just mentioned are combined as follows:

The dinitrotoluene is heated to about the boiling point, then the toluene and petrolatum are stirred therein, next the granulated powder of potassium chlorate and sugar is mixed with the wood pulp or fine sawdust and thoroughly mixed with the mixture of dinitrotoluene, toluene and petrolatum. The resulting product is a granular product, brown in color, waterproof, but having sufficient adhesiveness of the particles that they may be solidly packed into cartridges or tamped into drill holes.

I have discovered that the separate constituents of the dinitrotoluene, toluene and petrolatum tend to separate from each other, and in order to form a homogeneous mass which will form a more uniform mixture when combined with the granulated powder and the wood pulp, I raise to the boiling point the mixture of dinitrotoluene, toluene and petrolatum and add a small quantity of nitric acid thereto, four ounces to twenty pounds being sufficient, and continue boiling until no further nitric acid fumes are driven off. This treatment with nitric acid assists in making the mixture homogeneous, preventing the constituents from separating out, and when mixed with the wood pulp and granulated powder forms an efficient product.

It will be understood by those skilled in the art that the proportions of the ingredients may be varied and still give good results, for instance, if the ratio of potassium chlorate to the sugar is increased an explosive of greater power will result, tho for general purposes the proportions stated are preferred.

It will be understood that in place of sugar similar carbohydrates may be used, and for the wood pulp or fine sawdust other finely divided cellulose material may be substituted.

In place of the petrolatum another oily material of about the same consistency and miscible with the dinitrotoluene and toluene may be used.

Various changes may be made by those skilled in the art in the composition of the explosive and in the steps of the method, without departing from the spirit of my invention, as claimed.

I claim:

1. An explosive in the form of a granular powder consisting of the following ingredients in the proportions stated by weight:

| | Parts |
|---|---|
| Potassium chlorate | 35 |
| Sugar | 35 |
| Finely divided cellulose | 10 |
| Dinitrotoluene | 12 |
| Toluene | 6 |
| Petrolatum | 2 |

2. A method of making an explosive comprising heating dinitrotoluene, toluene and petrolatum to the boiling point, adding a small quantity of nitric acid thereto and continuing the boiling until the nitric acid fumes have passed off, and adding to the mixture finely divided cellulose and a granulated powder made of potassium chlorate and sugar, the granulated powder and the cellulose being taken in proportion that the total mixture results in a granulated powder.

DEWITT C. McMEANS.